Oct. 28, 1969  E. A. McLAIN  3,475,331
PERMEABILITY SEPARATORY APPARATUS AND PROCESS OF
MAKING AND USING SAME
Filed Feb. 23, 1968  3 Sheets-Sheet 1
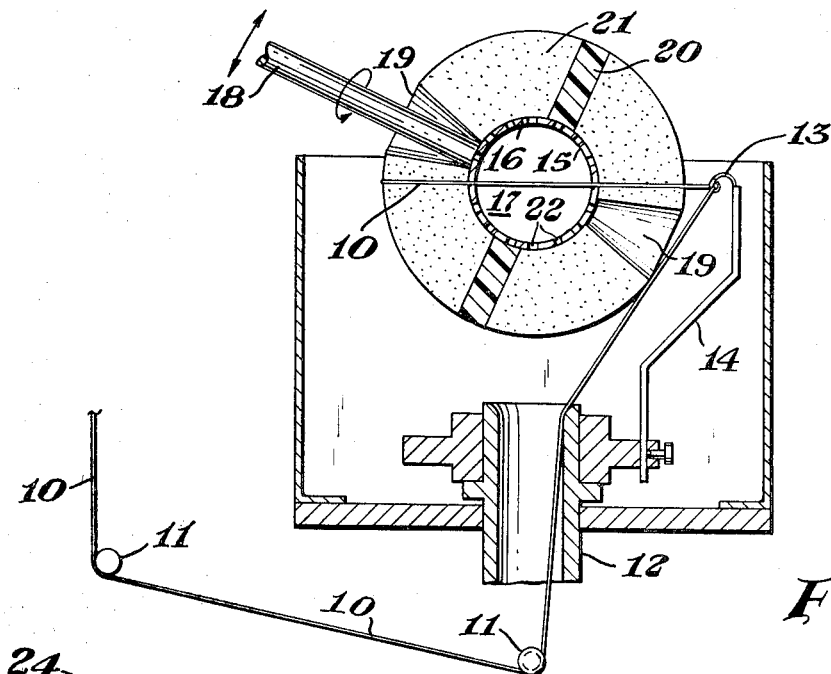
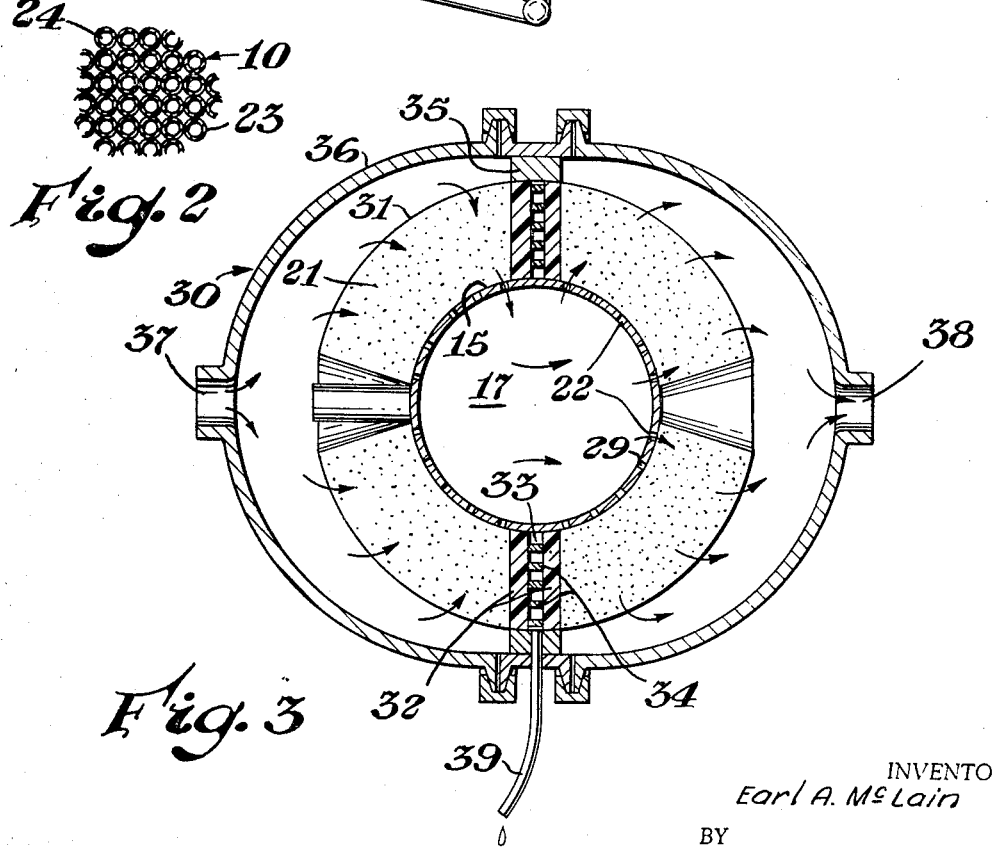
INVENTOR.
Earl A. McLain
BY
Griswold & Burdick
ATTORNEYS INVENTOR.
Earl A. McLain
BY
Griswold & Burdick
ATTORNEYS

United States Patent Office 3,475,331
Patented Oct. 28, 1969

3,475,331
PERMEABILITY SEPARATORY APPARATUS AND PROCESS OF MAKING AND USING SAME
Earl A. McLain, Walnut Creek, Calif., assignor to The Dow Chemical Company, Midland, Mich., a corporation of Delaware
Filed Feb. 23, 1968, Ser. No. 707,756
Int. Cl. C02b 1/82; B01d 13/00
U.S. Cl. 210—321      22 Claims

ABSTRACT OF THE DISCLOSURE

A novel arrangement of continuously hollow, selectively permeable fibers is utilized in preparing a permeability separatory pparatus having minimized pressure drop through the fibers and increased permeable surface area. The apparatus is useful in desalination, reverse osmosis, dialysis and the like.

BACKGROUND OF THE INVENTION

The present invention relates to a separatory apparatus utilizing selectively permeable membranes. More particularly it relates to an apparatus wherein the membrane comprises a multiplicity of continuously hollow fibers and to methods of making and using the apparatus.

Osmotic processes utilizing semipermeable membranes are known and the developed art encompasses a variety of membranes which are selectively permeable to various components of fluid mixtures and solutions. Selectively, some membranes allow the passage of water while restraining ions; others possess different transport rates across the membrane for two or more nonionic components; others, either inherently or by virtue of chemical modification are suitable for ion exchange purposes and selectively allow the passage of certain ions; others of the molecular sieve type are capable of separation based on molecular size; etc.

A notable advance in the art occurred in the preparation of selectively permeable membranes as continuously hollow fibers, particularly as fine bore fibers. Advantageously, the fine, hollow fibers have greatly increased permeable surface areas per unit volume and eliminate many mechanical requirements and limitations in the preparation and use of permeable sheets or plates. Additionally, the fiber can be prepared with a thin wall section which improves the rate of transfer across the membrane, yet still provides sufficient mechanical strength for fabrication of the apparatus and operation of the apparatus under super atmospheric pressure.

Hollow fiber separatory devices are disclosed in U.S. 3,228,876 and U.S. 3,228,877. In U.S. application Ser. No. 615,754, filed on Feb. 13, 1967, by H. I. Mahon et al., now abandoned, there is disclosed a hollow fiber separatory apparatus employing spiral windings of hollow fibers around a supporting core, the fibers terminating in a tube sheet essentially parallel to the longitudinal axis of the core. Other patents disclosing hollow fiber separatory devices include U.S. 3,246,764; U.S. 2,972,349; U.S. 3,186,941; U.S. 3,198,335 and U.S. 3,228,797.

The efficiency of a hollow fiber separatory apparatus is dependent on a number of factors. The thickness of the wall portion influences the transfer rate across the membrane and the wall therefore is, preferably, made as thin as possible. Generally, as the diameter of the fiber bore decreases the permeable surface area in a given unit volume greatly increases. However, as the bore decreases the pressure drop through the fiber increases and this places certain practical limitations on fiber bore and/or length. Additionally, the percentage of the total permeable surface area which is accessible to fluid contact influences the overall efficiency. Thus, the arrangement of the fibers as well as the physical dimensions and composition of the fibers is important in realizing the most efficient and economical separatory device.

SUMMARY OF THE INVENTION

Accordingly, this invention provides for a hollow fiber separatory apparatus which minimizes the problem of pressure drop with very fine bore fibers by a novel arrangement of the fibers which utilizes short lengths of fibers. The novel arrangement also provides for a porous fiber winding having a relatively large permeable surface area accessible to fluid contact.

The permeability separatory apparatus of this invention comprises a hollow fiber permeable member having the above advantageous novel fiber arrangement disposed within a fluid tight casing with means for mounting the permeable member in fluid tight sealing arrangement with the casing so as to permit a first fluid to contact the exterior surface of the fibers and a second fluid to contact the internal surface of the hollow fibers without mixing with the first fluid, said casing having means to admit the first fluid into contact with the fibers and to withdraw same and means to withdraw the second fluid from the apparatus.

The hollow fiber permeable member comprises a multiplicity of overlapping tridimensionally concentric loops of a continuously hollow, selectively permeable fiber wound around a central supporting core wherein the center of the core is a common center for the loops. The core comprises an outer shell enclosing a cavity therein and the shell has a plurality of perforations therethrough to permit fluids to flow into and out of the cavity. The permeable member further comprises at least one hard, resinous tube sheet section extending annularly from the outer surface of said core through the fiber layers to the outermost fiber windings and having an annular sealing relationship with said core. At least one small arcuate portion of each of a majority of the fiber loops is secured in the tube sheet, said tube sheet having cutaway surfaces wherein the arcuate portion is severed, exposing fiber ends having openings communicating with the internal surface of the hollow fibers. The fiber exterior surface adjacent the exposed fiber ends is in liquid tight sealing arrangement with the tube sheet. The invention further contemplates a method of making the permeable member and a permeability separatory apparatus employing the permeable member.

DETAILED DESCRIPTION

The invention may be more fully understood and the advantages thereof appreciated from the following detailed description and with reference to the accompanying drawings:

FIGURE 1 is a cross sectional elevation view of a partially completed permeable member and a device for its construction;

FIGURE 2 is a typical enlarged vertical fragmentary cross section through the hollow fiber winding of the permeable member of FIGURE 1;

FIGURE 3 is a cross sectional elevation view of an assembled permeability separatory apparatus employing the completed permeable member of FIGURE 1;

Figure 4:
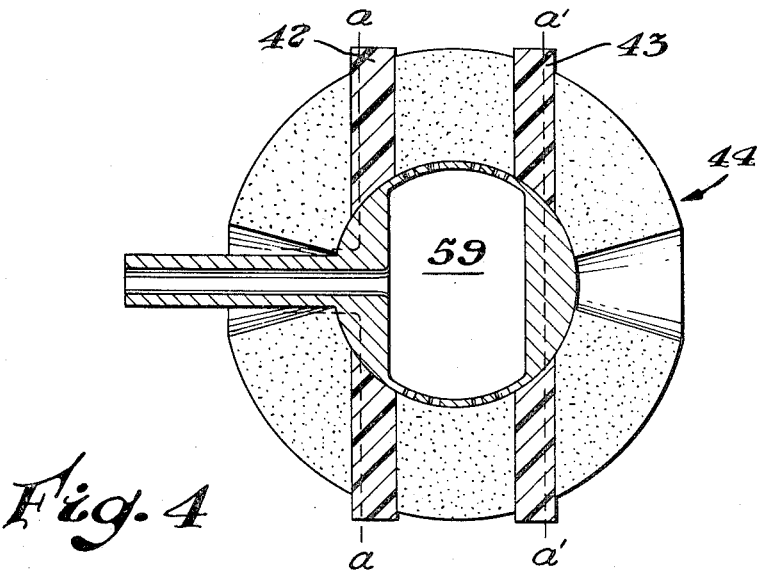
FIGURE 4 is a cross sectional elevation view of a permeable member in partially completed form having two tube sheets.

Various materials can be used for making the permeable continuous hollow fibers suitable for the practice of this invention. Most of these are organic materials, for example, polymeric materials such as the acetate, triacetate, propionate, nitrate, etc. esters of cellulose, including the mono-, di- and tri-esters and mixtures of such esters; cellulose ethers, such as methyl, ethyl, hydroxyalkyl, carboxyalkyl, etc., including mixed cellulose ethers; regenerated cellulose; polyvinyl alcohols; polysaccharides; casein and its derivatives; etc. Preferably the fiber is a cellulose acetate fiber in which the average degree of acetylation is from about 1 to about 3 acetyl units per cellulose unit and more preferably about 2.5. The aforementioned are hydrophilic in character and often are more advantageous in the treatment of aqueous fluid compositions.

However, for separation of organic components from some fluid mixtures, various hydrophobic materials are particularly suitable, such as: synthetic linear polyamides, polycarbonates, polyvinyl chloride and its copolymers, polyvinylidene chloride and its copolymers, acrylic ester polymers, organic silicone polymers, polyurethanes, polyvinyl formals and butyrals, and mixtures thereof, methacrylate polymers, styrene polymers, polyoefins, such as polyethylene, polypropylene, etc., and other polyesters, and mixtures of the foregoing. Acrylonitrile polymers, and also certain cellulose derivatives, such as mixed ether-esters, can be modified to make them either hydrophilic or hydrophobic for which ever characteristic is desired in the practice of this invention.

Any of the foregoing materials, as well as other suitable permeable, hollow fiber-forming materials including glass, etc., can be utilized according to this invention for selective separation of various fluid components as described herein, and where the hollow fiber membrane is either inherently suitable or modified so as to make it suitable for ion exchange purposes, such hollow fibers can be used for ion exchange by the practice of this invention.

Methods of making continuous hollow fibers suitable for the practice of this invention are known in the art, for example, see British Patent 514,638. In general, such fibers are spun by melt, dry or wet spinning techniques depending upon the particular fiber-forming materials being used. The spinnerette is selected according to the type of spinning procedure used and the particular dimensions desired in the hollow fiber. For the production of the hollow fiber, the spinnerette has a small annular opening in the orifice through which the spinning composition is extruded.

As a typical example, cellulose triacetate is spun into continuous hollow fibers by a wet spinning process in which the cellulose triacetate, together with whatever plasticizer or modifier is considered desirable to impart ultimately the permeable character, is dissolved in a suitable solvent to form a viscous spinning solution. This solution is extruded through the spinnerette into a coagulant bath. As the extruded solution comes in contact with the bath, the cellulose triacetate coagulates or gels in the desired form of a continuously hollow fiber of uniform wall thickness. If the coagulant bath is appropriate for imparting permeability to the fiber material, this characteristic is imparted to the fiber directly. If the coagulant bath is not so constituted, the fiber is led into a second bath to perform this function. The hollow fiber is then washed free of solvent or reagents and is either used directly in forming a permeable separatory member in accordance with the practice of this invention or is stored on a reel or bobbin or other suitable device for subsequent use.

According to this technique, extremely fine hollow fibers can be produced. The wall thickness is desirably sufficient to withstand the pressure that will be exerted in the subsequent permeability separation utilization of these fibers. Generally, a capability of withstanding pressures of 100 lbs. per square inch or more is desired. It is found that the small diameters of these fine hollow fibers permit the self-supporting membrane walls of the fiber to withstand considerable pressures.

The diameter and wall thickness is generally dependent on the end use of the separatory apparatus. For artificial kidney and like uses an outside diameter of about 300 to 350 microns is preferred with a wall thickness of about 10 to 30 microns. For desalination of brackish water or seawater and like uses an outside diameter of about 10 to 50 microns is preferred with a wall thickness of about 2 to 15 microns.

The transfer area of a permeability cell of this invention will vary according to the various dimensions of the hollow fiber, the type of winding used on the supporting core and the length, inside diameter and outside diameter of the wound bundle.

A device for preparing a permeable member according to this invention is shown in FIGURE 1 along with a partially completed permeable member. A core 15 having an outer shell 16 enclosing a cavity 17 therein is attached to a supporting shaft 18. A hollow fiber 10 coming from a spinning machine or being unwound from a bobbin (neither shown) passes around a yarn guide 11, through a hollow rotating shaft 12 and around yarn guide 13 which guides the fiber being wrapped around the core. The yarn guide 13 is attached to an arm 14 mounted to the rotatable shaft 12. The height of yarn guide 13 is adjusted by suitable means so that the yarn guide 13 rotates in a plane and describes a circular winding path about a center which coincides with the center of the core. The hollow shaft 12 is rotated by suitable means (not shown) which causes the arm 14 and the yarn guide 13 to rotate around the core, thereby wrapping fiber 10 around the core.

Simultaneous with the rotation of the yarn guide 13 about the core 15 the core is slowly rotated by rotating shaft 18 about its longitudinal axis, as indicated in the drawing. The axis of rotation of the shaft 18 and the core 15 passes through the center of the core making an angle of less than 90° with said winding plane. The shaft also undergoes an oscillatory motion, as indicated in the drawing, during the fiber winding operation with the center of oscillation being the center of the core. The axis of rotation may oscillate through an arc of from 5° to about 85° in a second plane perpendicular to the winding plane. The combined oscillatory and rotary motion of the shaft 18 produces a series of overlapping or crisscrossing concentric loops having a common center which coincides with the center of the core.

The oscillatory motion can be varied so as to distribute the fiber loops from a region adjacent to the shaft 18 to a region about 90 degrees from the longitudinal axis of the shaft and to intermediate ranges there between. The winding 21 of fibers so produced has a void 19 in the region adjacent the shaft and opposite thereto. The extent of the voids is regulated by the oscillatory motion of the shaft 18 which also controls the angle at which the fibers overlap.

A resinous tube sheet section 20 can be formed either during or after the winding operation. Preferably it is formed during the winding operation since better wetting of the individual fibers by the resin is obtained and fewer air pockets, voids, etc., remain in the cured resin. During the winding operation the uncured resin can be applied by suitable means (not shown) to the slowly rotating core and after application the resin is cured to form a hard resinous tube sheet section extending annularly from the outer surface of the core through the fiber layers to the outermost fiber windings and having an annular sealing relationship with said core. Obviously more than one tube sheet section can be made if desirable and the width of the section can be varied. The shell of the core has perforations 22 therethrough to permit fluids to flow into and out of the cavity.

An enlarged cross-section of the winding 21 is shown in FIGURE 2 wherein the fiber 10 comprises a wall section 23 and an orifice 24. For convenience all the drawings will represent the cross section of the fiber winding as shown in FIGURE 1 (21), but it is to be understood that the enlarged cross section shown in FIGURE 2 more truly depicts the sectional view. Since alternate layers of the fibers "crisscross," the actual fiber cross-section would be ellipsoidal. However, a circular section has been used to simplify the drawing.

A permeability separatory apparatus 30 employing a completed permeable member 31 produced by the process and apparatus of FIGURE 1 is shown in FIGURE 3. A tube sheet 32 was prepared by routing away portions of the tube sheet section (20 in FIGURE 1) to form an endless slot 33 running circumferentially around the core and extending outward to the exterior surface of the tube sheet and to expose fiber ends having openings communicating with the interior of the fiber. A porous spacer 34 is disposed within the slot and retained therein by a tube sheet cover 35 which forms with the slot 33 a fluid tight passageway between the tube sheets 32. The tube sheet cover 35 is also in liquid sealing engagement with a casing 36 enclosing the permeable member 31 and provides mechanical support for the member 31 within the casing.

In one mode of operation of the apparatus of FIGURE 3, a fluid is admitted to the permeability separatory apparatus by a fluid inlet 37 and withdrawn from an outlet 38. The tube sheet cover 35 prevents the fluid from passing around the permeable member 31 and directs the fluid to flow through the fiber winding, into the cavity 17 of the core 15 by means of the perforations 22 and thence outwards through the portion of the fiber winding on the other side of the tube sheet 32 and out the outlet 38. Arrows are shown to indicate the direction of fluid flow.

Fluids which permeate to the interior of the fibers flow to the slot 33 and thence to a product outlet 39. It is to be understood that the casing 36 may be constructed so as to withstand high internal pressure.

A hollow fiber separatory device similar to that of FIGURE 3 may be used to soften hard well water by reverse osmosis, for example. A device is constructed from an acetylated cellulose fiber (average degree of acetylation of 2.5) having an outside diameter of 45 microns and an inside diameter of 27 microns. The permeable wound member containing about 156 gm. of fiber is encased in a pressure casing. Well water is caused to flow at about 200 p.s.i. and about 70° F. around the exterior surfaces of the fibers. The softened water which permeates through the fiber is collected (e.g., through product outlet 39 in FIGURE 3). The results together with flow rates are as follows:

|  | Flow (cc/. min.) | Hardness (p.p.m. CaCO₃) |
| --- | --- | --- |
| Feed | 159 | 295 |
| Product | 85 | 38 |
| Waste Brine | 74 | 562 |

Hardness is determined by titration with ethylene diamine tetracetic acid.

FIGURE 4 is a sectional drawing of a partially completed permeable member 44 having two tube sheet sections 42 and 43 and intended to provide for circulation of a first fluid through the fibers as well as a second fluid around the fibers without mixing the two fluids. The device is constructed in a manner similar to that shown in FIGURE 1 except that two streams of uncured resin are applied to form, after curing, the tube sheet sections 42 and 43. Portions of the tube sheet sections and the fiber layers external to them are cut away along planes $a$ and $a'$ to expose fiber ends having openings communicating with the interior of the fibers.

Figure 5:
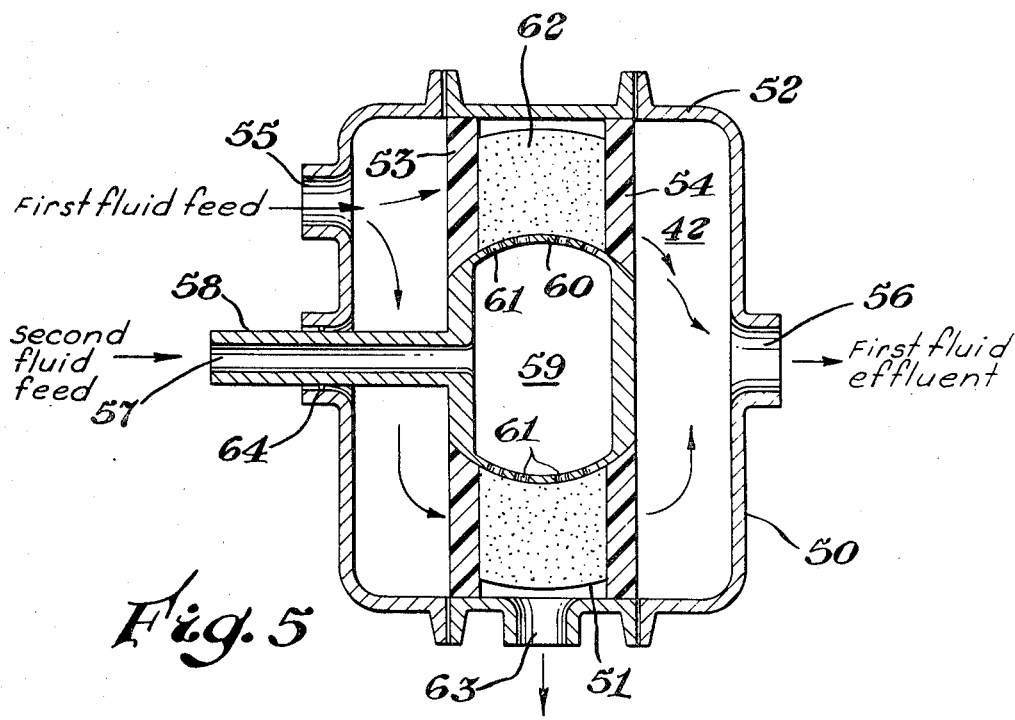
FIGURE 5 is a cross sectional elevation view of an assembled permeability separatory apparatus employing the completed permeable member of FIGURE 4.

A completed permeability separatory apparatus 50 utilizing a permeable member 51 prepared as in FIGURE 4 is shown in FIGURE 5. The permeable member 51 is disposed within a fluid tight casing 52 and has two tube sheets 53 and 54. The peripheral surface of the tube sheets 53 and 54 are in liquid sealing engagement with the casing 52.

In one mode of operation of the apparatus of FIGURE 5, fluid enters through the inlet 55, flows through the fibers having open ends in the tube sheets 53 and 54 and exits from the outlet 56. A second fluid enters through an inlet 57 contained within a shaft 58, wherein said inlet 57 communicates with the cavity 59 of the core 60, flows into the cavity 59, through the perforations 61 into the fiber windings 62 and exits from the outlet 63. An O-ring 64 is in liquid sealing relation with the shaft 58 and the casing 52.

A hollow fiber separatory device is constructed similar to FIGURE 5. The hollow fibers are of cellulose having the dimensions when wet of 45 micro O.D. x 27 micron I.D. The outer diameter of the spherical core is 4 inches. The equatorial diameter of the hollow fiber winding is 6 inches. The total weight of hollow fibers; (dry basis) in the device is 268 gm. The weight (dry basis) of the fibers not embedded in tube sheets is 172 gm.

A water solution containing 5% by weight of sucrose and 5% by weight of NaCl is flowed through the interior of the fibers at 454 cc./min. Water is flowed across the exterior of the fibers at a rate of 4,000 cc./min.

The wash water is analyzed for NaCl content by an automatic chloride titrator. Sucrose content is determined by difference (after evaporating an aliquot sample for dryness).

Salt transfer rate _____ gm./min.__ 9.5
Sucrose transfer rate _____ gm./min.__ 1.0
Relative rate, salt:sugar _____ 9.5

Figure 6:
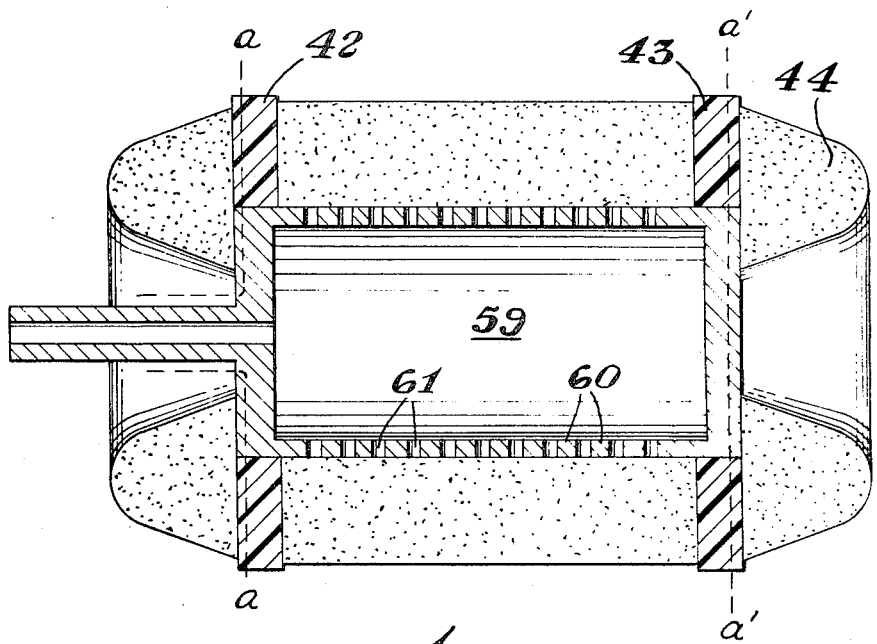
FIGURE 6 is a cross sectional elevation view of another embodiment of the member shown in FIGURE 4.

In some applications such as for blood dialysis it may be preferable to have a cylindrical core rather than a spherical one. FIGURE 6 illustrates a modification of the device shown in FIGURE 4 which is produced in a similar manner. Similar identifying numbers have been used to identify the elements of the separatory member since only the conformations have been altered. The separatory member operates in a similar manner to the member shown in FIGURE 4 when assembled into a pressure casing.

While the drawings have mainly shown spherical cores, other core shapes are possible such as cylindrical, ovate, etc. and the cores can be of varying sizes. The supporting core can be of any appropriate material which will resist the conditions to which it will be exposed during the formation and use of the permeability separatory apparatus.

The shell of the core has also been shown to have perforations. It is to be understood that cores made of metal or plastic screen, porous ceramic, fritted glass, etc. are included within the meaning of the term, perforated cores. It is only necessary that the core be of sufficient strength to give support to the fibers and to permit flow of fluids therethrough without disintegration of the core material or deleterious reaction with the fluid passing therethrough.

The radial depth or thickness of the fiber windings can be varied widely depending on the particular end use. The thickness also depends on the pressure required to maintain appropriate fluid flow rates through the fiber windings. Generally, a thickness from about 0.5 to about 10 inches from the inner diameter of the winding to the outer diameter of the winding is advantageous.

The tube sheet may be prepared from any suitable casting resin. The resin formulation should be selected to provide adequate bonding to the fibers, to have suitable machining qualities and have physical and chemical properties to withstand the fluid environment in which the cartridge is to be used. Epoxy resins are found particularly suitable for forming the tube sheet. However any casting resin which does not adversely affect the fibers and which gives the desired adhesion and strength characteristics can be used for this purpose. Typical examples of other suitable resins are: phenol-aldehyde resins, melamine-aldehyde resins, acrylic resins, etc. In addition to having the resin formulation inert to the fiber material, it is necessary that the formulation have a fluidity such as to penetrate and fill the desired volume of space between the fibers completely but without excessive lateral "wicking." The resin should adhere to the fibers and should, when cured, provide a fluid-tight seal at the particular pressures and temperatures to which the ultimate product is to be submitted.

Epoxy resins are particularly suited for this purpose because of their inertness to solvents and to chemical corrosion, their setting characteristics and their ability to effect fluid-tight seals under the conditions to which the permeability cell is to be exposed.

Particularly suitable epoxy resins are those derived from the diglycidyl ether of bisphenol together with appropriate modifiers and curing agents. However, other epoxy resins can also be used such as the diglycidyl ethers of resorcinol, dihydroxy diphenyl, hydroquinone, etc. These can be modified by the addition of modifying resins, preferably amine resins, and appropriate curing agents and solvents.

A particularly suitable casting formulation comprises about 14.7 parts of the diglycidyl ether of bisphenol, about 1.1 part of dimethylaminopropylamine, and about 6.8 parts of soya-1,3-propylenediamine as the curing agent. Where it is desirable to apply a primer to the metal surfaces to which the casting resin is to adhere, a very suitable composition consists of about 10 parts of diglycidyl ether of bisphenol, about 2.7 parts of N-(2-phenyl-2-hydroxyethyl)diethylenetriamine and about 7.3 parts of acetone.

After deposition, the resin in the tube sheet section is cured by known procedures, such as by exposure to elevated temperatures. In any such procedure, care must be exercised not to adversely affect the hollow fibers or the interfacial seal between the fiber and tube sheet. After curing, portions of the tube sheet section are cut away to form the tube sheet and expose fiber ends having openings communicating with the interior of the fibers. The exterior surface area of the fibers adjacent the fiber ends is secured in fluid-tight relation to the tube sheet. The tube sheet section may be cut away so as to form an essentially flat or planar surface, however the invention contemplates drilling staggered rows of appropriately spaced holes into the tube sheet section so that essentially every fiber loop is interrupted by at least one of a plurality of circular or cylindrical surfaces which are to be included within the meaning of the term "to cut away." When this is done, a porous spacer is not required. Further, the invention contemplates a header means integral with or fastened to the inside of the shell of the core wherein the holes are drilled through the shell as well as the resinous tube sheet to provide liquid access to said header.

The resin may be applied either during the winding operation or afterwards. Preferably, it is applied continuously during the winding operation and cured afterwards. Many different ways of applying the resin are possible including spraying, dripping, rolling, extruding and the like. It is of course, also possible to formulate the resin so that curing of the resin begins immediately whereby it rapidly becomes viscous and prevents or minimizes lateral "wicking."

A particular advantage of this invention relates to the slow rotation of the core as the fiber is wound around the core wherein the resin can be readily applied on a continuous basis without the resin being thrown off by centrifugal force. In rapidly rotating and reciprocating devices loss of resin in this manner is a problem. Additionally, the process of making the permeable member permits direct winding from the hollow fiber spinning process.

The permeability separatory apparatus of this invention has particular utility in desalination, reverse osmosis, dialysis, ion exchange, ion exclusion, separations based on molecular weight.

What is claimed is:

1. A permeable separatory member which comprises
   (a) a core having an outer shell portion enclosing a cavity therein, said shell having a plurality of perforations therethrough to permit fluid flow into or out of the cavity;
   (b) a multiplicity of continuously hollow, selectively permeable fibers wound around the core in a plurality of overlapping concentric loops wherein the center of the core generally, is a common center for said loops; and
   (c) at least one hard resinous tube sheet extending annularly from the outer surface of the core through the fiber layers to the outermost fiber windings and having an annular sealing relationship with said core wherein at least one minor arcuate portion of each of a majority of the fiber loops is secured in said tube sheet, said tube sheet having cutaway portions to form surfaces with exposed fiber ends having openings communicating with the interior of the hollow fibers and wherein the exterior surface of the hollow fibers generally adjacent to the fiber ends is in liquid tight sealing arrangement with the tube sheet.

2. The permeable member of claim 1 wherein said core is generally spheroidal.

3. The permeable member of claim 1 wherein said hollow fiber is a cellulose acetate fiber wherein the average degree of acetylation is from about 1 to about 3.

4. The permeable member of claim 1 comprising a single tube sheet section having cutaway portions defining an endless slot therein disposed circumferentially around the core and extending away from the core to the exterior surface of the tube sheet section thereby defining an annular passageway having two opposed surfaces having fiber ends therein.

5. A process for preparing a permeability separatory apparatus which comprises mounting a hollow fiber member consisting essentially of the member of claim 1 within a casing and attaching the tube sheets of said member in fluid-tight relation to the casing so as to permit a first fluid to contact the exterior surface of the fibers and to permit a second fluid to contact the internal surface of the fibers without mixing with the first fluid; said casing having means to admit a first fluid, means to withdraw the first fluid and means to withdraw the second fluid.

6. The permeable member of claim 1 wherein the tube sheet is prepared from a polyepoxide resin.

7. The permeable member of claim 1 wherein said cutaway portions of said tube sheet define in spaced relationship a plurality of holes generally extending radially towards the core.

8. The permeable member of claim 1 further comprising a shaft attached at one end to the core, said shaft defining an opening at the other end and a passageway therein, wherein the passageway communicates with the cavity of the core and the opening.

9. The permeable member of claim 8 comprising two tube sheets in spaced relationship to each other, each tube sheet having an exterior surface remote from the opposite tube sheet, and said surfaces having exposed fiber ends therein.

10. A permeability separatory apparatus which comprises a casing; a hollow fiber, permeable member disposed within the casing; means to mount the permeable member in fluid tight sealing relation with the casing so as to permit a first fluid to contact the exterior surface of the fibers and a second fluid to contact the internal surface of the fibers without mixing with the first fluid;

means to admit the first fluid into contact with the fibers; means to withdraw the first fluid from the apparatus; and means to withdraw the second fluid from the apparatus; said permeable member comprising (a) a core having an outer shell portion enclosing a cavity therein, said shell having a plurality of perforations therethrough to permit fluid flow into or out of the cavity;

(b) a multiplicity of continuously hollow, selectively permeable fibers wound around the core in a plurality of overlapping concentric loops wherein the center of the core is a common center for said loops; and (c) at least one hard resinous tube sheet extending annularly from the outer surface of the core through the fiber layers to the outermost fiber windings and having an annular sealing relationship with said core wherein at least one minor arcuate portion of each of a majority of the fiber loops is secured in said tube sheet, said tube sheet having cutaway portions to form surfaces with exposed fiber ends having openings communicating with the interior of the hollow fibers and wherein the exterior surface of the hollow fibers generally adjacent the fiber ends is in liquid tight sealing arrangement with the tube sheet.

11. The apparatus of claim 10 wherein said core is generally spheroidal.

12. The apparatus of claim 10 wherein said hollow fiber is a cellulose-acetate fiber wherein the average degree of acetylation is from about 1 to about 3.

13. The apparatus of claim 10 wherein the permeable member comprises a single tube sheet section having cutaway portions defining an endless slot therein disposed circumferentially around the core and extending away from the core to the exterior surface of the tube sheet section thereby defining an annular passageway having two opposed surfaces having fiber ends therein.

14. The apparatus of claim 10 wherein the tube sheets is prepared from a polyepoxide resin.

15. The apparatus of claim 10 wherein said cutaway portions of said tube sheet define in spaced relationship a plurality of holes generally extending radially towards the core.

16. The apparatus of claim 10 wherein the permeable member further comprises a shaft attached at one end to the core, said shaft defining an opening at the other end and a passageway therein wherein the passageway communicates with the cavity of the core and the opening.

17. The apparatus of claim 16 wherein the permeable member comprises two tube sheets in spaced relationship to each other, each tube sheet having an exterior surface remote from the opposite tube sheet, and said surfaces having exposed fiber end therein.

18. A process for making a permeable separatory member which comprises the steps of (a) winding at least one continuously hollow, selectively permeable fiber around a supported core to form a multiplicity of concentric loops wherein the center of the core is a common center for the loops and wherein the plane of winding has a center which coincides with the center of the core;

(b) rotating said core about an axis of rotation during the fiber winding step, said axis making an angle of less than 90 degrees with said winding plane;

(c) simultaneously oscillating the axis of rotation through an arc of from 5° to about 85° during the fiber winding step in a second plane perpendicular to said winding plane wherein the center of the core is the center of the period of oscillation and whereby the rotational and oscillatory motion provides an array of overlapping fiber loops;

(d) impregnating the space between the fibers in at least one annular zone around said core with a casting resin;

(e) curing said resin to form a tube sheet section; and (f) cutting away portions of the tube sheet section to form a tube sheet having surfaces with exposed fiber ends having openings communicating with the interior of the fibers.

19. The process of claim 18 wherein said fiber is a hollow cellulose acetate fiber wherein the average degree of acetylation is from about 1 to about 3.

20. The process of claim 18 wherein said resin is a polyepoxide resin.

21. The process of claim 18 wherein said casting resin is applied during the fiber winding step.

22. The process of claim 18 wherein the step of cutting away portions of the tube sheet sections comprises drilling in spaced relationship a plurality of holes generally extending radially towards the core.

References Cited

UNITED STATES PATENTS

| 3,198,335 | 8/1965 | Lewis et al. | 210—321 |
| 3,276,996 | 6/1966 | Lazare | 210—22 |
| 3,342,729 | 9/1967 | Strand | 210—23 |
| 3,422,200 | 8/1969 | McLain | 210—22 |

REUBEN FRIEDMAN, Primary Examiner

FRANK A. SPEARS, JR., Assistant Examiner

U.S. Cl. X.R.

210—494, 500; 29—163.5